3,440,311
METHOD FOR PREPARING COMPRESSED VERMICULAR GRAPHITE STRUCTURES
Franciszek Olstowski, Freeport, and Oliver Osborn, Lake Jackson, Tex., assignors to The Dow Chemical Company, Midland, Mich., a corporation of Delaware
No Drawing. Filed Mar. 30, 1966, Ser. No. 538,600
Int. Cl. C04b 35/54
U.S. Cl. 264—115                       5 Claims

ABSTRACT OF THE DISCLOSURE

This invention relates to a process for producing relatively high density integral structures of compressed vermicular graphite by intermingling strands of compressed vermicular graphite having a density of between about 0.3 gm./cc. and about 1.8 gm./cc. and compressing the intermingled strands under a compressive force of about 30 p.s.i.

---

This invention relates to a process for preparing compressed vermicular graphite structures and more particularly relates to an improved process for preparing relatively dense shaped structures from vermicular graphite employing an improved compression process.

Compression of vermicular graphite into shaped structures is a highly desirable way to directly fabricate shaped integral structures having the high heat resistance of graphite and requiring little or no machining to achieve even intricate shapes. However, due to the extremely low bulk density of vermicular graphite (usually between 0.002 and 0.02 gm./cc.), compression of such graphite to a high density, e.g. 2.0 gm./cc., involves volume changes of 100/1 or more combined with the application of relatively high pressure. Likewise, if substantial amounts of entrapped air remain in the graphite during compression, solid, high density structures cannot be made. The combination of large volume change together with the need for high compression and the need to eliminate entrapped air has presented serious mechanical problems, especially in the preparation of large compacts.

It is, therefore, an object of this invention to provide an improved process for producing relatively high density compressed vermicular graphite structures. A further object is to provide a process for producing relatively high density shaped compressed vermicular graphite structures which eliminates or substantially reduces the problems of large volume change and air entrapment. These and other objects and advantages of the present process will become apparent from reading the following detailed description.

It has now been discovered that relatively high density graphite structures are prepared by randomly intertwining strips or strands, e.g. strips or strands having been cut from compressed vermicular graphite having a density between about 0.3 gm./cc. and about 1.8 gm./cc. and compressing such intertwined strips or strands under a compressive force of at least about 30 p.s.i.

Vermicular graphite as used herein refers to a low bulk density, particulate, worm-like form of graphite which may be prepared, for example, by treating natural flake graphite with an intercalating agent such as fuming nitric acid, fuming sulfuric acid, mixtures of concentrated nitric and sulfuric acids, and the like, and heating the thus treated graphite to a high temperature, e.g. above 500° C. to produce the light weight vermicular graphite. Such material is easily compressible to form small integral monolithic structures of any desired shape. However, massive equipment would be required to compress large volumes of such vermicular graphite in a single step.

Compression of a mass of vermicular graphite along a single axis produces a structure having a high degree of electrical and thermal anisotropy. The axis of compression is the axis of lowest electrical and thermal conductivity and the axis at right angles to the compression axis shows the highest electrical and thermal conductivity. Increasing the force or pressure on the compacted vermicular graphite increases the density of the compact and increases the anisotropy ratio between the axis of compression and the axis at right angles to that of compression. Therefore, structures prepared from compressed vermicular graphite may have a wide variety of electrical and thermal conductivity properties.

Compressed vermicular graphite useful in the process of this invention has a particle density between about 0.3 and about 1.8 gm./cc. and is physically in the form of strips or strands having a length to diameter or width ratio of at least 8/1 and preferably from about 14/1 to about 100/1 or more. The strips should be at least one inch long and preferably less than about 0.03 inch wide. Such strips or strands may be prepared directly by compressing vermicular graphite into the desired elongated shape of the proper density or preferably, they may be prepared by slicing or shredding of compressed vermicular graphite structures such as foils, sheets, blocks, scraps and the like.

Such strands of compressed vermicular graphite are formed into relatively high density structures by applying a compressive force to a mass of such strands. The electrical and thermal conductivity characteristics of the compressed structure may be controlled by the manner in which the compression is applied, i.e. uniaxial compression yields compacts having electrical and thermal anisotropy, biaxial compression reduces such anisotropy and little or no anisotropy is produced by triaxial or isostatic compression. Where such conductivity characteristics are not important, a random arrangement of the strands is generally most convenient and therefore preferred. A compressive force of at least about 30 p.s.i. is needed to provide an integral structure having sufficient strength to permit handling. In general a compressive force of between about 500 and about 50,000 p.s.i. or higher is preferred. Compressive forces of less than about 500 p.s.i. tend to "felt" the strands and form relatively weak compacts having limited utility, for structural applications.

This invention provides a process for the preparation of structures requiring a volume change during compression of only about 2/1 to about 40/1 and to make compacts having densities in the range of from about 0.7 to about 2.1 gm./cc. Due to the nature and physical form of the strands, substantially no air is entrapped during compression and therefore no special provision for air removal is required to produce structures having good physical strength. The strands of this invention can be lightly packed in a mold or container without irreversible deformation of the strands. They may, therefore, be "re-fluffed" at a later time back to their original volume. Vermicular graphite, however, once even lightly compressed or packed is irreversibly deformed and cannot be returned to its original volume.

The following examples are provided to further illustrate the invention but are not to be construed as limiting the scope thereof.

Example 1

A compressed vermicular graphite foil having a density of 1.6 gm./cc., and a thickness of 0.010 inch was cut into strips about 0.1 inch wide and about 10 inches long. Each strip or strand, therefore, having a length-to-width ratio of about 100:1.

A random mass of such strands, having an excelsior-like appearance and having a bulk density before any compaction of about 0.02 gm./cc. (1.45 lbs./ft.³) was uniaxially compressed in a mold under a compressive force of 17,000 p.s.i. to yield a well cohered, flexible sheet of graphite having the following properties:

| | |
|---|---|
| Thickness inch | 0.056 |
| Apparent density gm./cc | 1.70 |
| Specific resistance (in the plane of the sheet) microhm-inches | 224 |
| Ultimate tensile strength p.s.i | 1140 |

For comparison a mass of vermiular graphite having a bulk density of 0.0045 gm./cc. was placed in a mold having 5 times the volume of the mold used for compression of the graphite strands. A uniaxial force of 17,000 p.s.i. was applied to such mass of graphite to yield a sheet having the following properties:

| | |
|---|---|
| Thickness inch | 0.076 |
| Apparent density gm./cc | 1.12 |
| Specific resistance (in the plane of the sheet) microhm-inches | 235 |
| Ultimate tensile strength p.s.i | 703 |

For further comparison, a vermicular graphite block having a density of 0.05 gm./cc. was broken into pieces in the range of from about ¼ to ¾ inch in the largest dimension and having a length-to-width ratio of about 2:1 or less. The aggregate of broken pieces had an apparent bulk density of 0.039 gm./cc. Such pieces were placed in a mold and compressed under a force of 17,000 p.s.i. to produce a flexible graphite sheet having the following properties:

| | |
|---|---|
| Thickness inch | 0.057 |
| Apparent density gm./cc | 1.44 |
| Specific resistance (in the plane of the sheet) microhm-inches | 272 |
| Ultimate tensile strength p.s.i | 257 |

Example 2

A graphite foil having a density of 1.2 gm./cc. was made by compressing vermicular graphite between two rollers. The foil was then shredded into strips having lengths of 3 to 4 inches, widths of 1/32 to 3/10 inch and thickness of 0.016 inch. A random mass of such strips were fluffed by shaking and found to have a bulk density of 0.154 gm./cc. They, therefore, even in a fluffed condition occupy only about 1/30 of the volume of the same weight of typical vermicular graphite.

A portion of the fluffed mass of compressed vermicular graphite excelsior was compressed under a pressure of 17,000 p.s.i. to yield a flat, non-brittle plate of graphite having the following properties:

| | |
|---|---|
| Thickness inch | 0.118 |
| Apparent density gm./cc | 1.84 |
| Specific resistance (in the plane of the plate) microhm-inches | 216 |
| Ultimate tensile strength p.s.i | 725 |

Another portion of the fluffed mass of compressed vermicular graphite excelsior was then placed in a rubber bag, the bag was evacuated to remove the air therefrom and the bag containing such graphite excelsior was isostatically compressed under a compressive force of 45,000 p.s.i. Upon removal from the bag, the graphite was found to be a cohered monolithic structure having a density of 2.03 gm./cc. and having a compressive strength of about 1100 p.s.i.

Example 3

A foil was prepared by uniaxially compressing vermicular graphite having an apparent bulk density of about 0.005 gm./cc. to a density of about 1.2 gms./cc. and a thickness of about 0.037 inch. The foil was cut into strands measuring about 5" long and about ⅛" wide. 75.5 grams of the intermingled strands were placed in a large beaker and occupied a volume of about 1500 cc. The strands were mashed by hand to a volume of about 400 cc., then were easily "refluffed" to the original volume of 1500 cc.

The strands were then placed in a mold measuring 5" x 5" x 3.875" and were uniaxially compressed under a force of one p.s.i. Such compression mashed the strands to a thickness of 1⅛ inches (2.86 cm.); the apparent bulk density of the compact was calculated as 0.172 gm./cc. The compact had very little physical integrity and could be easily re-shredded (torn apart) with the fingers.

Further compression under about 400 p.s.i. produced a compact having a density of about .934 gm./cc. The compact was found to be a strong well-cohered integral structure in which the individual strands were no longer clearly discernible and could not be separated as an entity from the compact.

Pressure of about 1600 p.s.i. was applied to the compact and produced a density of about 1.16 gms./cc. and the structure became stronger and more resistant to indentation.

The compact was then further compressed under 4000 p.s.i. to a density of about 1.46 gms./cc. and became more resistant to indentation. The total compression ratio (volume change) of the mass of strands was about 29/1.

In comparison, vermicular graphite of an apparent bulk density of 0.005 gm./cc., when uniaxially compressed to a density of 1.46 gms./cc. undergoes a compression ratio (volume change) of 292/1.

We claim:
1. A process for preparing a relatively dense integral graphite structure comprising the steps of:
    (a) compressing vermicular graphite to form said graphite into a thin foil having a density of between about 0.3 gm./cc. and about 1.8 gm./cc.,
    (b) cutting said formed graphite foil into relatively narrow strands,
    (c) interwining said formed graphite strands into a random mass, and
    (d) compressing said mass of intertwined graphite strands under a pressure of at least 30 p.s.i. to form said mass into a relatively dense integral graphite structure.

2. The process of claim 1 wherein the length to width ratio of the formed strands of graphite is at least 8 to 1.

3. The process of claim 1 wherein the length to width ratio of the formed strands of graphite is from about 14 to 1 to about 100 to 1.

4. The process of claim 1 wherein the density of the individual strands of graphite is between about 0.5 gm./cc. and 1.6 gm./cc.

5. The process of claim 1 wherein the compression applied to said intermingled strands of graphite is from about 500 p.s.i. to about 50,000 p.s.i.

References Cited

UNITED STATES PATENTS

| 2,957,756 | 10/1960 | Bacon | 23—209.2 |
| 3,107,973 | 10/1963 | Bickerdike et al. | 264—109 |
| 3,323,869 | 6/1967 | Olstowski | 23—209.1 |

FOREIGN PATENTS 991,581  5/1965  Great Britain.

ROBERT F. WHITE, *Primary Examiner.*

JAMES R. HALL, *Assistant Examiner.*

U.S. Cl. X.R.

264—120; 23—209.2, 209.1